US 11,756,751 B2

(12) United States Patent
Esders

(10) Patent No.: US 11,756,751 B2
(45) Date of Patent: Sep. 12, 2023

(54) FUNCTIONAL COMPONENT HAVING A KEY FUNCTION

(71) Applicant: KOSTAL Automobil Elektrik GmbH & Co. KG, Luedenscheid (DE)

(72) Inventor: Berthold Esders, Schalksmuehle (DE)

(73) Assignee: Kostal Automobil Elektrik GmbH & Co. KG, Luedenscheid (DE)

( * ) Notice: Subject to any disclaimer, the term of this patent is extended or adjusted under 35 U.S.C. 154(b) by 12 days.

(21) Appl. No.: 17/692,956

(22) Filed: Mar. 11, 2022

(65) Prior Publication Data

US 2022/0199334 A1    Jun. 23, 2022

Related U.S. Application Data

(63) Continuation of application No. PCT/EP2020/085916, filed on Dec. 14, 2020.

(30) Foreign Application Priority Data

Dec. 18, 2019 (DE) .................... 10 2019 008 826.3

(51) Int. Cl.
*H01H 13/04* (2006.01)
*H01H 13/705* (2006.01)

(52) U.S. Cl.
CPC .......... *H01H 13/04* (2013.01); *H01H 13/705* (2013.01); *H01H 2209/002* (2013.01); *H01H 2209/052* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

2015/0027868 A1* 1/2015 Gao ..................... H01H 13/063
200/341
2017/0076879 A1* 3/2017 Weaver ................. H01H 13/14

FOREIGN PATENT DOCUMENTS

| CN | 201839556 U | 5/2011 |
| DE | 3641003 A1 | 6/1988 |
| DE | 10237719 A1 | 2/2004 |
| JP | 2004164908 A | 6/2004 |

OTHER PUBLICATIONS

The International Bureau of WIPO, PCT Written Opinion of the International Searching Authority for International Application No. PCT/EP2020/085916 dated Mar. 25, 2021.

(Continued)

*Primary Examiner* — Ahmed M Saeed
(74) *Attorney, Agent, or Firm* — Brooks Kushman P.C.

(57) ABSTRACT

A functional component having a button function includes a support component, a film, and an electrical switching element. The support component has a recess. The film covers the recess. The electrical switching element is situated below the recess and is actuatable by pressure being exerted on the film in the area above the recess. A ring-shaped or hollow cylindrical body is situated along an inner edge surface of the recess and is in contact with the film.

15 Claims, 2 Drawing Sheets

(56) References Cited

OTHER PUBLICATIONS

European Patent Office, International Search Report for International Application No. PCT/EP2020/085916, dated Mar. 25, 2021.
German Patent and Trademark Office, German Search Report for corresponding German Patent Application No. DE 10 2019 008 826.3, dated Jul. 3, 2020.

* cited by examiner

Fig. 2
(Conventional)
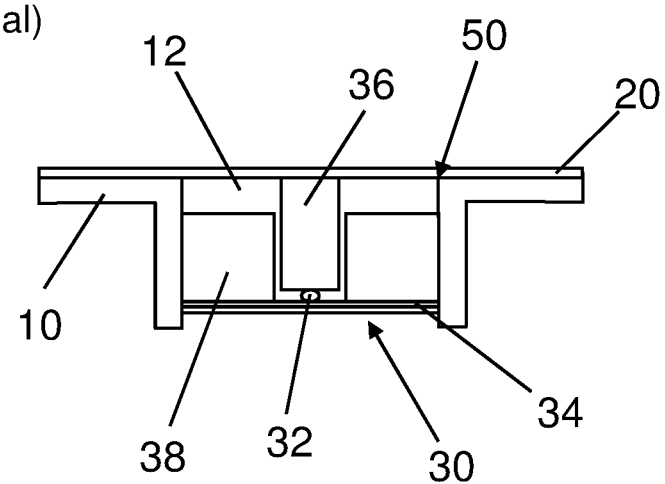

FUNCTIONAL COMPONENT HAVING A KEY FUNCTION

CROSS-REFERENCE TO RELATED APPLICATIONS

This application is a continuation of International Application No. PCT/EP2020/085916, published in German, with an international filing date of Dec. 14, 2020, which claims priority to DE 10 2019 008 826.3, filed Dec. 18, 2019, the disclosures of which are incorporated in their entirety by reference herein.

TECHNICAL FIELD

The present invention relates to a functional component having a button function, the functional component including a hard support component having at least one recess, a film that covers the recess, and a mechanically actuatable electrical switching element situated below the recess, the switching element may be actuated by exerting pressure on the film in the area above the recess.

BACKGROUND

A functional component of this type is known from German patent application DE 36 41 003 A1, in which the film is designed as an outwardly convexly curved elastic film.

For some applications, use of a convexly curved elastic film is not acceptable for reasons of the desired design and haptics (feel). Thus, in the automotive sector, for example, flat, high-gloss surfaces are desirable which should still allow mechanical switching elements situated underneath to be actuated.

The films provided for this purpose are often over-molded or back molded with a plastic material, or also flooded with a curing (hardening) plastic material.

It is problematic that such films are only slightly elastic, especially due to the additionally applied plastic layer. Therefore, such a film that is stretched over a recess in an operator interface tends to buckle or snap off at the edges of the recess. This may result in crease lines, kinks, or indentations that remain permanently visible.

SUMMARY

An object is a generic functional component for which this problem is reduced or entirely eliminated.

In embodiments of the present invention, a functional component having a key function includes a hard support component, a film, and a mechanically operable electric switching element. The support component has a recess. The film covers the recess of the support component. The switching element is arranged below the recess and can be operated by exerting pressure on the film in the region above the recess. An annular or hollow cylindrical body is arranged along the inner edge surface of the recess and is in contact with the film.

Embodiments of the present invention achieve the above object and/or other objects in that a ring-shaped or hollow cylindrical body is situated along the inner edge surface of the recess and in contact with the film.

BRIEF DESCRIPTION OF THE DRAWINGS

Exemplary embodiments of functional components in accordance with the present invention are illustrated and explained in greater detail below with reference to the drawings, which include the following:

FIG. 2 illustrates a conventional functional component;

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
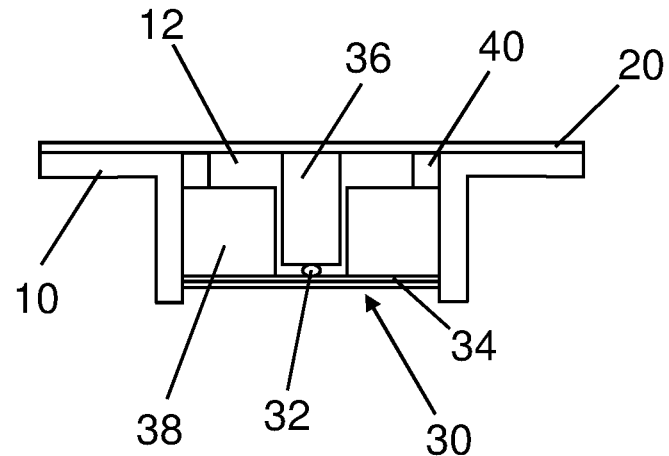
FIG. 1 illustrates a functional component in accordance with a first exemplary embodiment of the present invention.

Referring now to FIG. 1, a functional component in accordance with a first exemplary embodiment of the present invention will be described. The functional component has a key or button function. The functional component includes a hard support component (carrier) 10, a film (foil) 20, and an electrical switch 30. Support component 10 includes a recess 12. Film 20 covers recess 12 of support element 10. Electrical switch 30 includes a mechanically actuatable switching element 32. Switching element 32 is arranged below recess 12 and can be operated by exerting pressure on film 20 in the region above the recess. An annular or hollow cylindrical body 40 is arranged along the inner edge surface of recess 12 and is in contact with film 20.

With continual reference to FIG. 1, the problem leading to functional components in accordance with the present invention will be explained with reference to FIG. 2, based on a schematically illustrated functional component having a conventional design. The conventional functional component shown in FIG. 2 includes support component 10, film 20, and electrical switch 30.

Support component 10 is made of a hard material; i.e., support component 10 does not yield under light pressure. In particular, support component 10 is made of a non-elastic plastic. Film 20 is situated on the surface of support component 10 and covers recess 12 of support component 10.

Electrical switch 30 is arranged within recess 12 and is situated below film 20. Electrical switch 30 includes a mechanically actuatable switching element 32, a circuit board 34, a switching tappet (plunger) 36, and a switch housing 38. Switching element 32 rests or is seated on circuit board 34. Switching tappet 36 is in mechanical contact on the one hand with switching element 32, and on the other hand with an end section on the bottom or underside of film 20. Switch housing 38 guides switching tappet 36.

Switching element 32 is preferably designed as a snap dome or snap disk, or as a fully assembled short-stroke switch. As a result, switching element 32 may advantageously be activated or triggered by a small actuating travel distance or path of switching tappet 36.

It is assumed that film 20 is likewise made of a hard, i.e., nonelastic, material. This is the case for most such decorative and highly transparent films.

Electrical switch 30 is actuated by applying pressure to the surface of film 20 in the area of recess 12, and ideally directly above switching tappet 36. As a result, film 20 arches or curves convexly into recess 12 and switching tappet 36 moves in the direction toward switching element 32.

A problem is that film 20 buckles at transition areas 50 between hard support component 10 and recess 12. The edge area of recess 12 thus forms a circumferential buckling point or kink.

The buckling or kinking of film 20 when pressure is applied may result in changes in the material properties at the affected locations on film 20. These changes remain permanently visible as indentations or crease lines at the affected locations on film 20, which is generally undesirable.

This problem is exacerbated even further when film 20 is back-molded, over molded, or flooded with another hard plastic material.

Figure 3:
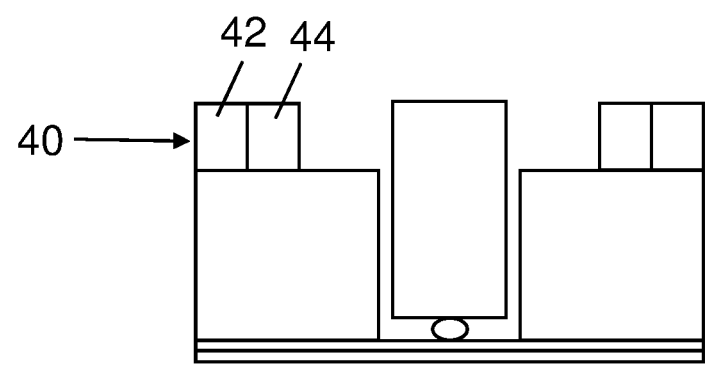
FIG. 3 illustrates a functional component in accordance with a second exemplary embodiment of the present invention.
Figure 4:
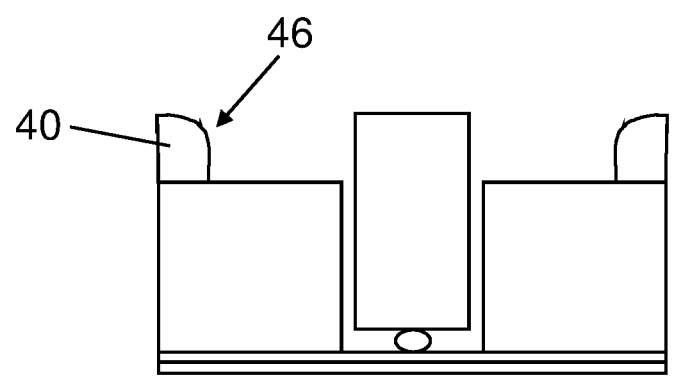
FIG. 4 illustrates a functional component in accordance with a third exemplary embodiment of the present invention.

Functional components in accordance with embodiments of the present invention represent approaches for solving this problem. FIGS. 1, 3, and 4 illustrate functional components in accordance with first, second, and third exemplary embodiments of the present invention, respectively. The basic design of functional components in accordance with embodiments of the present invention is largely the same as the conventional functional component shown in FIG. 2. However, there are notable differences as will now be explained.

Turning back to FIG. 1, the functional component in accordance with the first exemplary embodiment shown in FIG. 1 includes a body 40 that is made of a flexible soft material. Body 40 is situated along the inner edge surface of recess 12 and in contact with film 20.

Body 40 illustrated in a sectional view in FIG. 1 is adapted to the cross-sectional shape of recess 12, and thus has a circular, round, or polygonal annular (ring) shape. It is important that body 40 elastically supports film 20 at the edge of recess 12, at least at transition areas 50 (designated in FIG. 2).

When pressure is applied to film 20 in the area of switching tappet 36, convexly curved film 20 deforms the outer face sections of body 40 that film 20 contacts, so that no right-angled or acute-angled edge, at which film 20 could sharply buckle or bend, occurs at body 40. As a result, indentations and crease or fold lines on film 20 may be effectively avoided.

Soft body 40 may advantageously be formed by a foam material. The deformability of soft body 40 is designed to correspond to the particular application and the type of film 20 used.

Two embodiment variants of the functional component according to the present invention are explained with reference to FIGS. 3 and 4. In each case, support component 10 and film 20 are not illustrated in order to simplify the diagrams.

In the second embodiment of the functional component schematically illustrated in FIG. 3, body 40 is formed from multiple, in the present case two, for example, concentrically interlinked rings 42, 44. Rings 42, 44 fit concentrically one inside the other. Rings 42, 44 may be made of different materials. In particular, rings 42, 44 may be made of materials having different softness. It is advantageous to provide a softness gradient that progresses from harder at the outside (e.g., ring 42) to softer toward the inside (e.g., ring 44), since, due to the bending radius of film 20 becoming larger toward the middle of recess 12, it is advantageous for the deformability of body 40 to increase in the same direction.

In the third embodiment of the functional component schematically illustrated in FIG. 4, body 40 has an outer contour 46 that is rounded in sections. When the button is pressed, film 20 rests against rounded outer contour 46. As a result, an excessively small bending radius, and thus buckling of film 20, are avoided.

LIST OF REFERENCE NUMERALS 10 support component (carrier)
12 recess
20 film (foil)
30 switch
32 switching element
34 circuit board
36 switching tappet (plunger)
38 switch housing
40 body
42, 44 rings
46 rounded outer contour
50 transition areas While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A functional component having a button function, comprising:
    a carrier having a recess, wherein a periphery of the recess is surrounded by an edge surface of the carrier;
    a film arranged on the carrier and covering the recess;
    an electrical switch arranged within the recess and below the film, the electrical switch including a mechanically actuatable switching element;
    wherein the film arches into the recess, and thereby causes the switching element to actuate, in response to pressure exerted in an area of the film above the recess in a direction toward the recess;
    a deformable body arranged within the recess along the edge surface of the carrier and in contact with a portion of the film, the deformable body elastically supporting the film at the periphery of the recess; and
    wherein the electrical switch further includes a circuit board, a switching plunger, and a switch housing for guiding the switching plunger, the switching element resting on the circuit board, and the switching plunger being in mechanical contact with the switching element and with the film; and
    the film when arching into the recess moves the switching plunger toward the switching element whereby the switching element actuates.

2. The functional component of claim 1 wherein:
    the deformable body includes one or more elastomers.

3. The functional component of claim 1 wherein:
    the deformable body includes one or more foam materials.

4. The functional component of claim 1 wherein:
the deformable body has a rounded outer contour.

5. The functional component of claim 1 wherein:
the film is of a non-elastomeric material.

6. The functional component of claim 1 wherein:
the film is back molded or over molded with a thermoplastic plastic.

7. The functional component of claim 1 wherein:
the film is flooded with a curing plastic.

8. The functional component of claim 1 wherein:
the carrier is of a non-elastic plastic;
the film is of a non-elastic material; and
the deformable body is of a foam.

9. The functional component of claim 1 wherein:
the deformable body is connected at least to one of the carrier and the switch housing.

10. The functional component of claim 1 wherein:
the portion of the film in contact with the deformable body deforms the deformable body when the film arches into the recess whereby no bend of the portion of the film occurs.

11. The functional component of claim 10 wherein:
the deformable body includes a plurality of deformable rings which fit concentrically within one another, the deformable rings having different degrees of deformability.

12. The functional component of claim 11 wherein:
the deformability of the deformable rings increases as the deformable rings progress away from the edge surface of the carrier.

13. The functional component of claim 10 wherein:
the deformable body has a rounded outer contour.

14. A functional component having a button function, comprising:
a carrier having a recess, wherein a periphery of the recess is surrounded by an edge surface of the carrier;
a film arranged on the carrier and covering the recess;
an electrical switch arranged within the recess and below the film, the electrical switch including a mechanically actuatable switching element;
wherein the film arches into the recess, and thereby causes the switching element to actuate, in response to pressure exerted in an area of the film above the recess in a direction toward the recess;
a deformable body arranged within the recess along the edge surface of the carrier and in contact with a portion of the film, the deformable body elastically supporting the film at the periphery of the recess; and
wherein the portion of the film in contact with the deformable body deforms the deformable body when the film arches into the recess whereby no bend of the portion of the film occurs; and
the deformable body includes a plurality of deformable rings which fit concentrically within one another, the deformable rings having different degrees of deformability.

15. The functional component of claim 14 wherein:
the deformability of the deformable rings increases as the deformable rings progress away from the edge surface of the carrier.

* * * * *